United States Patent [19]

Goll

[11] Patent Number: 5,109,931
[45] Date of Patent: May 5, 1992

[54] TRACTOR DRAWBAR HITCH

[76] Inventor: Charles J. Goll, RFD 2, Box 167, Marthasville, Mo. 63357

[21] Appl. No.: 690,636

[22] Filed: Apr. 24, 1991

[51] Int. Cl.$^5$ .............................................. B60D 1/00
[52] U.S. Cl. .................................. 172/248; 172/677; 280/416.1
[58] Field of Search ............... 172/248, 677, 776, 679; 280/515, 416.1

[56] References Cited

U.S. PATENT DOCUMENTS

| 2,654,613 | 10/1953 | Blair et al. | 280/515 |
| 3,922,006 | 11/1975 | Borges | 280/416.1 |
| 3,951,434 | 4/1976 | Sause | 280/416.1 |
| 4,022,490 | 5/1977 | Rocksvold | 280/416.1 X |
| 4,799,706 | 1/1989 | Myers et al. | 280/504 |

FOREIGN PATENT DOCUMENTS

| 763778 | 12/1956 | United Kingdom | 280/416.1 |
| 804954 | 11/1958 | United Kingdom | 280/416.1 |

Primary Examiner—Randolph A. Reese
Assistant Examiner—Jeffrey L. Thompson
Attorney, Agent, or Firm—Robbins & Robbins

[57] ABSTRACT

A hitch is provided for standard tractor drawbars having two hitch pin holes. The hitch is connected in a forward hole by a pivot pin which permits the hitch to be rotated over the rear hole to receive an implement tongue between the drawbar and the hitch. The hitch may be disengaged by lifting a hitch lock fitting over the drawbar and simply rotating the hitch to a forward position over the drawbar to clear the rear drawbar hole for conventional use. The lock is pivotally mounted on a horizontal axis on the hitch and may be lifted upwardly from a drawbar engaging position in the locked position to a drawbar disengaged position to permit movement of the hitch.

11 Claims, 1 Drawing Sheet

TRACTOR DRAWBAR HITCH

BACKGROUND OF THE INVENTION

Drawbars for farm tractors have been conventionally provided in the past which extend axially to the rear of the tractor for connecting various types of implements. A standard drawbar has two holes at the rear. The holes receive standard pins for connection to an implement tongue, clevises or the like.

With the advent of heavier and different types of implements a captured ring in the implement tongue has been designed to reduce wear, this desirably requires a yoke or U-shaped fitting at the end of the drawbar to receive the implement tongue between the drawbar and the fitting. The usual connecting pin fits through registering holes in the drawbar, the implement tongue and the hitch fitting.

Such fittings in the past while working well for a particular implement provided with the capturing ring hitch require special tools and connections to the drawbar. Specially drilled holes in the drawbar may be required and the fittings can not be readily adapted to leave one hole of the drawbar free for use with implements having a tongue with a simple hole not requiring the yoke or U-shaped fittings or implements having a yoke type fitting at the end of the tongue.

SUMMARY OF THE INVENTION

By means of this invention there has been provided a hitch for tractor drawbars which can be simply moved from an engaged position overlying the drawbar pin receiving hole to form a U-shaped to a disengaged position leaving the drawbar hole free for other usage.

The hitch is simply attached to one of the two conventional pre-existing holes in the drawbar by a bolt fitting through the hole. A lock connected to the hitch permits the hitch to be locked in the hitch engaged and hitch disengaged positions. By lifting the lock, the hitch is simply rotated between the two positions with the lock being dropped to engage the drawbar to prevent movement of the hitch.

The hitch is comprised of a Z-shaped plate in the form of a strap having a base supported upon the drawbar for pivotal movement. The base is connected by an upstanding web to a hitch plate having a pin receiving hole positioned in registry with the standard rear hole in the drawbar when the hitch is in the engaged position. In the hitch engaged position, a U-shaped yoke is formed with the drawbar which receives a tongue of an implement by a connecting pin. This form of yoke hitch is especially useful for implements having a captured ring hitch. When the hitch is moved from the engaged position to the disengaged position, the hitch plate closely overlies the drawbar to provide a compact and clear structure and minimize any protuberances that might cause entanglement or the like.

A lock is provided which may be simply lifted out of engagement with the drawbar to permit the rotation of the hitch between the engaged and disengaged positions. The lock is pivotally connected on a horizontal axis to the hitch and has a pair of lock plates which closely straddle the sides of the drawbar in the lock engaged position. The lock is simply lifted to disengage the lock plates for unlocking and then dropped into the locked position for the hitch and disengaged positions.

The hitch is easily fitted to existing drawbars with only a standard connecting bolt required to connect it to the forward hole of the standard tractor drawbar provided with the usual two holes. It provides a simple and efficient structure for adapting the drawbar to a U-shaped yoke type hitch when in the hitch engaged position or when disengaged, permitting the use of the drawbar with the rear hole cleared for conventional use. The hitch is rugged, simple to use and attach to a standard tractor drawbar and by being made of standard components is of relatively low cost.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
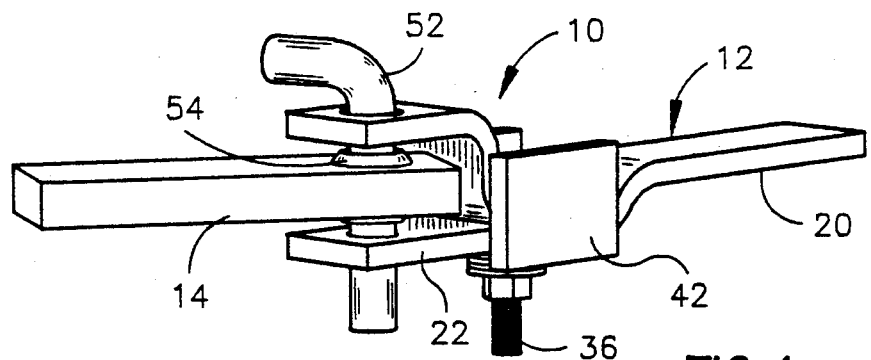
FIG. 1 is a pictorial view showing the hitch in the engaged position.

The hitch of this invention is generally indicated by the reference numeral 10, such as in FIG. 1, where it is shown attached to a tractor drawbar 12 receiving the front end of the tongue 14 attached to an implement of one type or another (not shown). The hitch is shown in the engaged position while in FIG. 2 it is shown in the disengaged position to leave a rear opening 16 of the drawbar clear for use with other types of connections such as a tongue having a U-shaped front end, a clevis or other standard usages.

Figure 4:
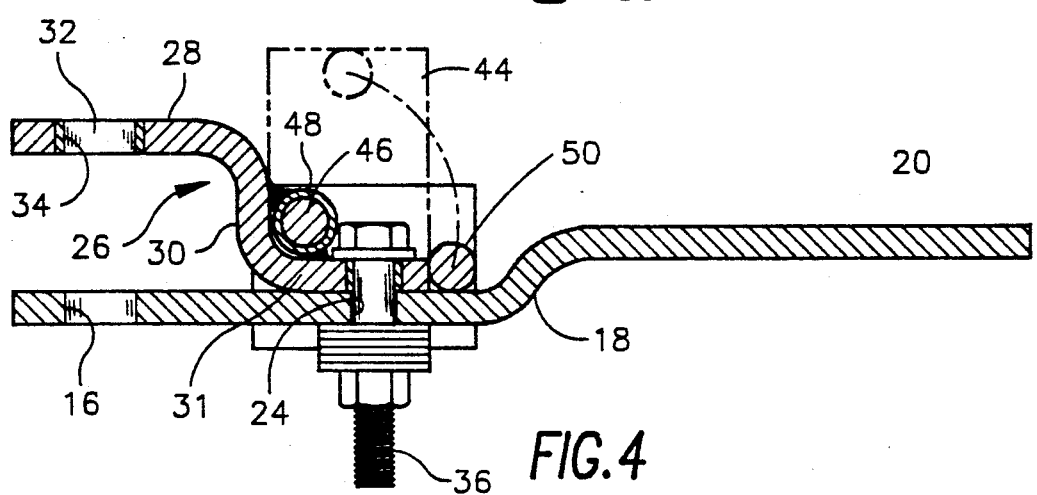
FIG. 4 is a view in vertical section on the longitudinal axis of the hitch.

The drawbar with which the hitch 10 is employed is of standard construction having a bend 18 connecting a forward end 20 to the tractor (not shown) and a rear end 22 provided with the usual rear opening 16 and a forward opening 24 to which the hitch 10 is connected, as best shown in FIG. 4.

The hitch is comprised of a Z-shaped hitch plate 26 having a hitch end 28 connected by a web 30 to a base 31 which rests on top of the rear end 22 of drawbar 12. The hitch end 28 is provided with a hitch pin opening 32 having a wear sleeve 34. The hitch plate 26 is connected to the drawbar for pivotal movement by a bolt 36 which is fitted through a bushing 38 and the forward opening 24 of the drawbar. The bushing is slightly higher than the thickness of the base 30 in order that the bolt may be tightened against it while permitting free rotation of the hitch plate.

Figure 2:
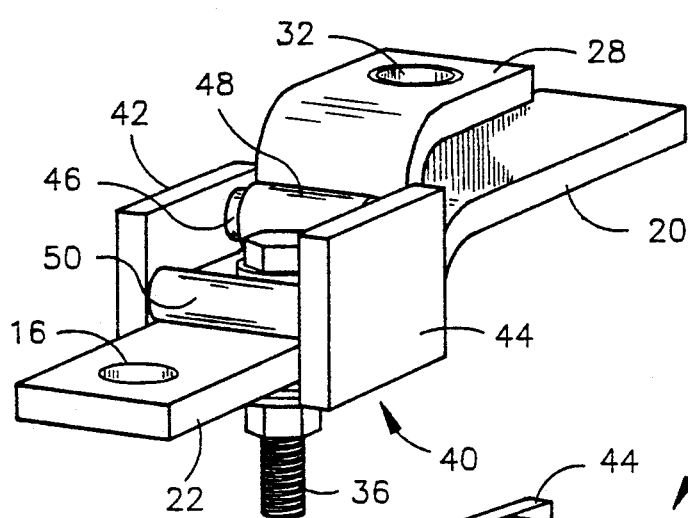
FIG. 2 is an enlarged pictorial view similar to FIG. 1 showing the hitch in the disengaged position.

A lock 40 is provided in order to lock the hitch in the engaged position shown in FIG. 1 and the disengaged position shown in FIG. 2. The lock is generally U-shaped or yoke-shaped and has stop elements 42 and 44 which closely straddle the sides of the drawbar to prevent pivotal movement of the hitch plate in the engaged or disengaged positions.

Figure 3:
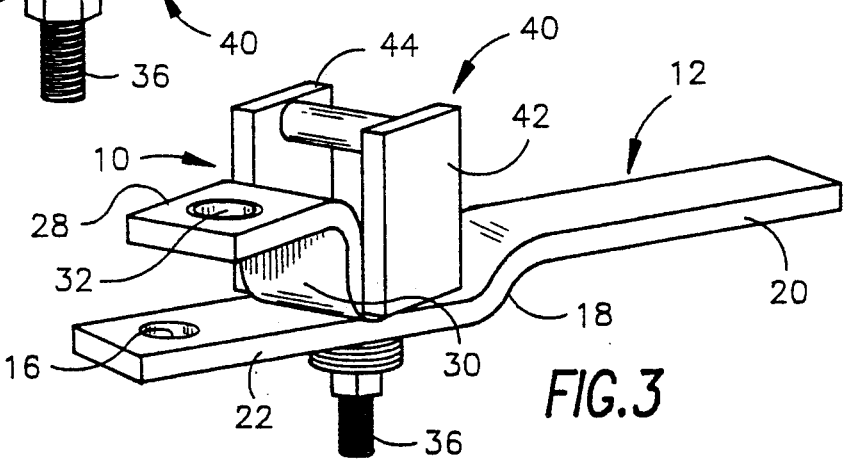
FIG. 3 is a pictorial view showing the hitch with the lock disengaged and an intermediate position of the hitch between the engaged and disengaged positions.

The lock is designed to be lifted easily from the locked positions shown in FIGS. 1, 2 and 3 to the unlocked position shown in FIG. 3 and the dotted lines of FIG. 4 by pivotal movement about a shaft 46. The shaft 46 is connected at opposite ends to the stop elements 42 and 44 and is fitted through a sleeve 48 welded to the hitch plate. A rest also connected between the stop elements is provided by the rest bar 50 which holds the lock in the engaged position by resting on top of the drawbar.

USE

The hitch plate is designed for simple attachment to the usual tractor drawbar 12 by simply connecting it to the already provided forward opening 24. A standard bolt 36 connects the base to the drawbar.

The hitch is shown in the hitch engaged position in FIGS. 1 and 4. In the hitch engaged position the hitch end 28 and web 30 form a U-shaped yoke with the drawbar end 22 with openings 32 and 16 in registry. In FIG. 1 it is shown connected to the tongue 14 of an implement with a connecting pin 52 fitting through the hitch opening 32, a caged ball 54 at the forward end of the tongue and the drawbar opening 16.

The hitch is simply disengaged after the connecting pin has been removed by lifting the lock 40 to the position shown in FIG. 3 and the dotted lines of FIG. 4 and pivoting it over the hitch disengaged position of FIG. 2. The lock is then dropped to the lock engaged position where the stop elements straddle the drawbar. In the hitch disengaged position the hitch end extends over the bend 18 of the drawbar and closely overlies the forward portion 20 of the drawbar to minimize protuberances that might cause dangerous entanglement. When so disengaged the hitch leaves the rear opening 16 of the drawbar clear for any use as desired.

Various changes and modifications may be made within this invention as will be apparent to those skilled in the art. Such changes and modifications are within the scope and teaching of this invention as defined in the claims appended hereto.

What is claimed is:

1. A tractor drawbar and hitch for receiving a tongue of an implement, said implement being adapted to be connected to an implement connecting pin receiving hole in said drawbar, said hitch comprising a hitch member having means for pivotally connecting it to said hole in said drawbar for rotary movement about a vertical axis between an engaged hitch position in which an implement connecting pin receiving hole in the hitch member is in registry with the pin receiving hole in said drawbar and a disengaged position to clear said hitch member hole from registry with said drawbar hole and a lock member pivotally connected to said hitch member for rotary movement about a horizontal axis, said lock member being moveable between a locked position in engagement with the drawbar to lock said hitch member and an unlocked position in disengagement with the drawbar to free the hitch member for said rotary movement between said engaged and disengaged positions.

2. The hitch of claim 1 in which said lock member is comprised of a pair of lock elements closely straddling sides of the drawbar in the lock engaged position to prevent rotary movement of the hitch about the vertical axis, and said lock elements being moveable upwardly clear of the drawbar in the lock disengaged position.

3. The hitch of claim 2 in which said lock member is provided with a horizontal shaft fitting through a horizontal sleeve connected to said hitch to provide means for moving the lock elements upwardly to clear the lock elements from the drawbar in the lock disengaged position.

4. The hitch of claim 2 in which said lock member is provided with a rest element resting upon a top surface of the drawbar to restrain the lock member in the lock engaged position.

5. The hitch of claim 1 in which means for pivotally connecting the hitch member to the drawbar are provided by a pin element fitting through a standard pre-existing hole in said drawbar which is provided in said drawbar forward of said implement connecting pin receiving hole.

6. The hitch of claim 1 in which said hitch member is a substantially Z-shaped member having a flat base supportable upon a top flat surface of the drawbar and a hitch end connected by a web to said base and having a pin receiving opening registering with said pin receiving hole in the drawbar in the hitch engaged position and said lock member is comprised of a pair of lock elements closely straddling sides of the drawbar in the lock engaged position to prevent rotary movement of the hitch about the vertical axis, and said lock elements being moveable upwardly clear of the drawbar in the lock disengaged position.

7. The hitch of claim 6 in which said means for pivotally connecting the hitch member to the drawbar is provided by a pin element fitting through a standard pre-existing hole in said drawbar which is provided in said drawbar forward of said implement connecting pin receiving hole.

8. The hitch of claim 1 in which said lock member is comprised of a pair of lock elements closely straddling sides of the drawbar in the lock engaged position to prevent rotary movement of the hitch about the vertical axis, and said lock elements being moveable upwardly clear of the drawbar in the lock disengaging position and said means for pivotally connecting the hitch member to the drawbar is provided by a pin element fitting through a standard pre-existing hole in said drawbar which is provided in said drawbar forward of said implement connecting pin receiving hole.

9. The hitch of claim 1 in which a base of the hitch member rests over a straight end of the drawbar and is pivotable from the engaged to a disengaged position short of a bend in the drawbar and in the disengaged position the hitch end closely overlies a raised forward portion of the drawbar.

10. A tractor drawbar and hitch for receiving a tongue of an implement, said implement being adapted to be connected to an implement connecting pin receiving hole in said drawbar, said hitch comprising a hitch member having means for pivotally connecting it to said hole in said drawbar for rotary movement about a vertical axis between an engaged hitch position in which an implement connecting pin receiving hole in the hitch member is in registry with the pin receiving hole in said drawbar and a disengaged position to clear said hitch member hole from registry with said drawbar hole and a lock member pivotally connected to said hitch member for rotary movement about a horizontal axis, said lock member being moveable between a locked position in engagement with the drawbar to lock said hitch member and an unlocked position in disengagement with the drawbar to free the hitch member for said rotary movement between said engaged and disengaged positions, said hitch member being a substantially Z-shaped member having a flat base supportable upon a top flat surface of the drawbar and a hitch end connected by a web to said base and having a pin receiving opening registering with said pin receiving hole in the drawbar in the hitch engaged position.

11. A tractor drawbar and hitch for receiving a tongue of an implement, said implement being adapted to be connected to an implement connecting pin receiving hole in said drawbar, said hitch comprising a hitch member having means for pivotally connecting it to said hole in said drawbar for rotary movement about a vertical axis between an engaged hitch position in which an implement connecting pin receiving hole in the hitch member is in registry with the pin receiving hole in said drawbar and a disengaged position to clear said hitch member hole from registry with said drawbar hole and a lock member pivotally connected to said hitch member for rotary movement about a horizontal axis, said lock member being moveable between a locked position in engagement with the drawbar to lock said hitch member and an unlocked position in disengagement with the drawbar to free the hitch member for said rotary movement between said engaged and disengaged positions, said lock member comprising a pair of lock elements closely straddling said sides of the drawbar in the hitch engaged position and the hitch disengaged position.

* * * * *

UNITED STATES PATENT AND TRADEMARK OFFICE
CERTIFICATE OF CORRECTION

PATENT NO. : 5,109,931
DATED : May 5, 1992
INVENTOR(S) : Charles J. Goll

It is certified that error appears in the above-identified patent and that said Letters Patent is hereby corrected as shown below:

Claim 1, line 49, "said"(1st occur.) should be -- a second --.

Claim 10, line 57, "said" should be -- a second --

Claim 11, line 13, "said" should be -- a second --.

Signed and Sealed this

Twentieth Day of July, 1993

Attest:

MICHAEL K. KIRK

*Attesting Officer*  *Acting Commissioner of Patents and Trademarks*